United States Patent [19]

Miyauchi et al.

[11] Patent Number: 5,412,860
[45] Date of Patent: May 9, 1995

[54] METHOD OF MAKING A BACK-REST FRAME FOR A SEAT

[75] Inventors: Fumio Miyauchi; Shouzi Mizuno, both of Kanagawa, Japan

[73] Assignee: Ikeda Bussan Co., Ltd., Ayase, Japan

[21] Appl. No.: 147,436

[22] Filed: Nov. 5, 1993

Related U.S. Application Data

[62] Division of Ser. No. 797,939, Nov. 26, 1991, abandoned.

[30] Foreign Application Priority Data

Nov. 26, 1990 [JP] Japan ................ 2-124452 U

[51] Int. Cl.⁶ ............................................ B23P 17/00
[52] U.S. Cl. ......................................... 29/527.1; 29/557; 29/897.2; 297/452.2
[58] Field of Search ................ 29/897.2, 527.1, 527.5, 29/527.6, 557, 558; 297/452.18, 452.19, 452.2 a; 72/254, 256

[56] References Cited

U.S. PATENT DOCUMENTS

| | | | |
|---|---|---|---|
| 2,720,914 | 10/1955 | Doty et al. | 297/452.19 |
| 2,767,780 | 10/1956 | Adler | 297/460 |
| 3,544,164 | 12/1970 | Ohta | 297/452.2 |
| 4,348,053 | 9/1982 | Strassle | 297/458 X |
| 4,544,204 | 10/1985 | Schmale . | |
| 4,575,153 | 3/1986 | Aoki et al. | 297/452.2 |
| 4,630,864 | 12/1986 | Toll | 297/452 X |
| 4,701,036 | 8/1988 | Vogel . | |
| 4,717,202 | 1/1988 | Batchelder, III et al. | 297/452 X |
| 4,746,168 | 5/1988 | Bracesco . | |
| 4,796,954 | 1/1989 | Saito | 297/452.2 |
| 4,907,735 | 3/1990 | Ushioda et al. | 29/897.2 |
| 5,048,890 | 9/1991 | Masuda | 72/256 |

FOREIGN PATENT DOCUMENTS

| | | | |
|---|---|---|---|
| 0722006 | 11/1965 | Canada | 297/452 |
| 0233822 | 8/1987 | European Pat. Off. | 297/452 |
| 236146 | 9/1987 | European Pat. Off. | 297/452.2 |
| 0263189 | 4/1988 | European Pat. Off. . | |
| 0359429 | 3/1990 | European Pat. Off. . | |
| 3829886 | 6/1989 | Germany . | |
| 2212718 | 8/1989 | United Kingdom . | |
| 2246699 | 2/1992 | United Kingdom . | |

OTHER PUBLICATIONS

Krafthand, vol. 1/2, Jan. 20, 1990, p. 32, Bad Woerishofen, Germany.

Primary Examiner—Mark Rosenbaum
Assistant Examiner—David P. Bryant
Attorney, Agent, or Firm—Foley & Lardner

[57] ABSTRACT

A back-rest frame of a vehicular seat comprises a generally U-shaped frame member. The frame member includes a generally U-shaped upper section with which a pair of side sections are integrally connected. The frame member is formed of an elongate material which is made of an aluminum light alloy and has the same sectional shape throughout the length thereof. The elongate material includes a hollow base section with which extended wall sections are integral. The frame member is produced by bending the elongate material into a generally U-shape and then by cutting off the extended wall sections from a part corresponding to the upper section of the frame member.

20 Claims, 3 Drawing Sheets 5,412,860

METHOD OF MAKING A BACK-REST FRAME FOR A SEAT

This application is a division of application Ser. No. 07/797,939, filed Nov. 26, 1991, now abandoned.

BACKGROUND OF THE INVENTION

1. Field of the Invention

This invention relates to improvements in a back-rest frame of a seat and more particularly to a back-rest frame including side sections each provided with an extended wall portion and a generally U-shaped upper section connecting the side sections.

2. Description of the Prior Art

A variety of back-rest frames for seats such as vehicular seats have been hitherto proposed and put into practical use. One of them is shown in FIGS. 6 and 7. Referring to FIGS. 6 and 7, a back-rest frame 2 includes a generally rectangular 5 pipe frame member 1. Plate members 3, 3 having a generally L-shaped cross-section are welded to the generally vertical portions of the pipe frame member 2 thereby constituting side sections 1a, 1a. The side sections 1a, 1a maintain their necessary strength under the effect of the pipe frame member 2. The plate members 3, 3 are arranged to be provided with a seat reclining mechanism.

Another back-rest frame is shown in FIGS. 8 and 9. Referring to FIGS. 8 and 9, a back-rest frame 4 includes plate members 6, 6 each of which has a generally C-shaped cross-section and serves as a side section 4a. A generally U-shaped pipe member 5 is welded to the upper ends of the plate members 6, 6 to fixedly connect them thereby serving as an upper section 4b. Additionally, a straight pipe member 7 is welded to the lower ends of the plate members 6, 6 to fixedly connect them. The plate members 6, 6 are arranged to be provided with a seat reclining mechanism.

In the above conventional back-rest frames 1, 4, the pipe members 2, 5 and the plate members 3, 6 constituting the back-rest frames 1, 4 are usually made of ferrous alloy such as mild steel or hard steel in order to obtain a sufficient strength.

However, drawbacks have been encountered in the conventional back-rest frames 1, 4 as set forth below. That is, the side sections 1a, 4a to which the seat reclining mechanism is installed cannot have a complicated closed sectional shape or cannot be formed into a pipe shape. Accordingly, it is usual to employ a ferrous alloy as the material of the side sections 1a, 4a. Additionally, the back-rest frames 1, 4 are assembled by connecting the plate members 3, 6 and the pipe members 2, 5 by welding. This increases the number of component parts of the back-rest frame which increases the weight of the same while also requiring troublesome welding operations which increase the cost of the back-rest.

SUMMARY OF THE INVENTION

It is an object of the present invention to provide an improved back-rest frame of a seat, which is light in weight and low in production cost.

Another object of the present invention is to provide an improved back-rest frame of a seat, which has a small number of component parts and does not require any troublesome welding operation.

A further object of the present invention is to provide an improved back-rest frame of a seat, which is formed of an elongate frame material of a light alloy containing aluminium as a main component and having the same cross-sectional shape throughout the length thereof.

The back-frame of the present invention is for a seat and is comprised of a generally U-shaped upper section having first and second ends. First and second elongate side sections are integrally connected respectively with the first and second ends of the upper section. Each of the first and second side sections includes an elongate hollow base portion, and extended wall portions formed along the length of the base portion. The upper section and the side sections constitute a generally U-shaped frame member. The frame member is formed of an elongate frame material of a light alloy containing aluminium as a main component. The frame material has the same cross-sectional shape throughout the length thereof and includes a hollow base section corresponding to the base portion of the side section of the frame member. The frame material further includes extended wall sections formed along the length of the base section and corresponding to the extended wall portions of the base section of the frame member. The extended wall sections are removed from the upper section of the frame member.

By virtue of forming the frame member of the hollow frame material of light alloy and having the same cross-sectional shape, the upper section having the closed sectional shape is formed integral with the side sections each of which has the closed sectional shape and is integrally formed with the extended wall portions. As a result, the number of component parts is decreased while rendering unnecessary welding operations, thereby lightening the weight and reducing the production cost of the resultant back-frame of the seat.

DETAILED DESCRIPTION OF THE INVENTION

Figure 1:
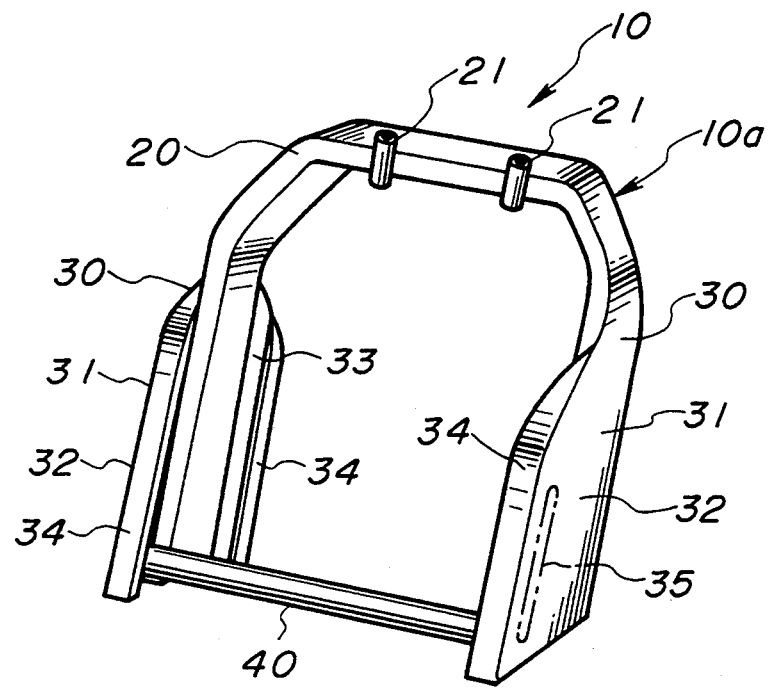
FIG. 1 is a perspective view of an embodiment of a back-rest frame according to the present invention, in an operational standing condition.
Figure 2:
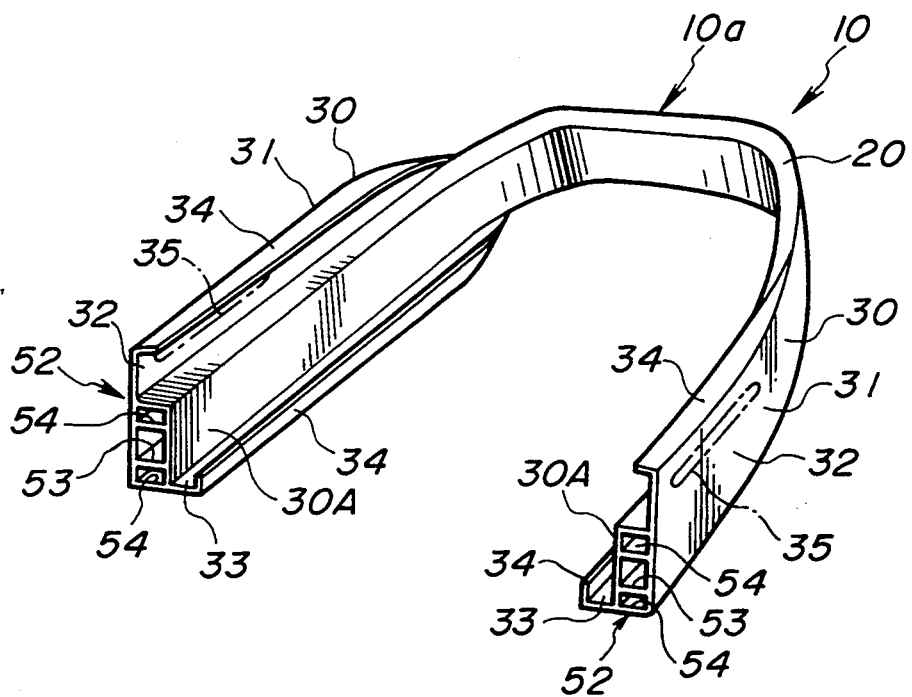
FIG. 2 is a perspective view of the back-rest frame of FIG. 1, rotated about 90°.

Referring now to FIGS. 1 and 2 of the drawings, a preferred embodiment of a back-rest frame of a seat according to the present invention is illustrated by the reference numeral 10. The seat is, in this embodiment, used in an automotive vehicle (not shown). The back-rest frame 10 forms part of a back-rest to which the back of a vehicle passenger seated on the seat is supported, though not shown. The back-rest frame 10 comprises a frame member 10a with a generally U-shaped upper section 20 having opposite end portions (no numerals). A pair of parallely arranged side sections 30, 30 are respectively integral at their one end portions with the end portions of the upper section 20. Each side section 30 includes a generally prism-shaped hollow base portion 30A. An extended wall portion 31 extends from the base portion 30A and is formed along the length of the base portion 30A. Thus, the frame member 10a of the back-rest frame 10 is formed generally U-shaped.

Figure 3:
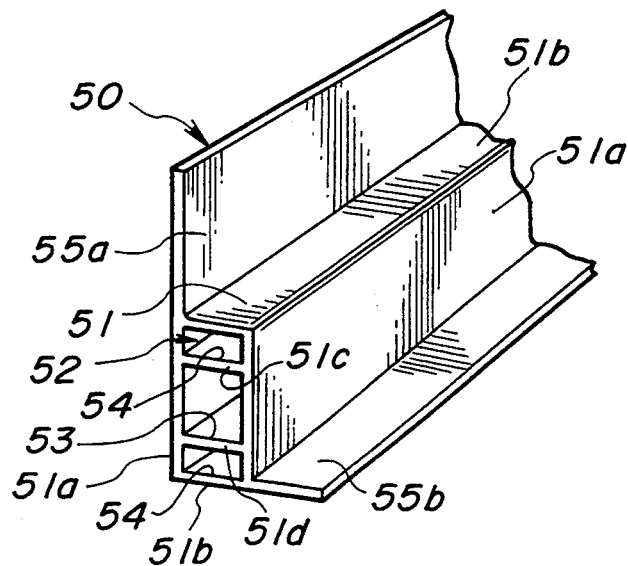
FIG. 3 is a fragmentary enlarged perspective view of a frame material of which the back-rest frame of FIG. 1 is formed.

The frame 10a is formed of an elongate frame material 50 as shown in FIG. 3. The frame material 50 includes an elongate hollow base section 51 which has a rectangular cross-section and extends along the length thereof. In this embodiment, the elongate hollow base section 51 is made up of a pair of parallel wide elongate walls 51a, 51a and a pair of parallel narrow elongate walls 51b, 51b which are integrally connected with the adjacent walls so as to form a hollow prism. Additionally, two parallel narrow elongate walls 51c, 51d are located inside the hollow prism and integrally interposed between the wide elongate walls 51a, 51a. The walls 51c, 51d are parallel with each other and parallel with the walls 51b, 51b so as to define a central hollow 53 (having a rectangular cross-section) therebetween and two side hollows 54, 54 (having rectangular cross-sections) each defined between each wall 51b and each of the walls 51c, 51d. The walls 51c, 51d and the hollows 53, 54 extend along the length of the base section 51.

The frame material 50 further includes side and rear extended wall portions 55a, 55b formed integral with the base section 51. The side wall section 55a is integrally connected and flush with the outside wide wall 51a, while the rear wall section 55b is integrally connected and flush with the outside narrow wall 51b. Thus, the extended wall sections 55a, 55b are arranged perpendicular to each other. In this frame material, the side and rear wall portions 55a, 55b extend along the length of the base section 51.

The frame material 50 is prepared by causing a light alloy (aluminium alloy) to undergo an extrusion (molding). The light alloy contains aluminium as a main component. The side and rear wall portions 55a, 55b of the frame material 50 are partly cut off to form the upper section 20 of the frame member 10a of the back-rest frame 10.

Referring back to FIG. 1, the upper section 20 of the frame member 10a is fixedly provided with a pair of cylindrical holder members 21, 21 for supporting stays (not shown) of a head rest (not shown) to which the head of the vehicle passenger is supported. The side sections 30, 30 extend respectively from the end portions of the upper section 20 to form parallely extending leg-like sections integral with the upper section 20. The extended wall portion 31 includes a side wall part 32 and a rear wall part 33 which respectively correspond to the side and rear wall portions 55a, 55b of the frame material 50. The side wall part 32 extends forward from the base portion 30A while the rear wall part 33 extends inwardly from the base portion 30A, as seen from FIG. 1. The side and rear wall parts 32, 33 are arranged to be generally L-shaped in cross-section upon incorporation with the outer wall of the base portion 30A as clearly shown in FIG. 2.

The elongate end of each of the side and rear wall parts 32, 33 is bent generally at right angles thereby to form a reinforcement flange 34. Additionally, each side wall part 32 is formed with an elongate projection or bead 35 which extends along the length of the side section 30. It will be understood that the side wall part 32 may be provided, for example, with a known seat reclining mechanism (not shown).

As shown in FIG. 1, a hollow elongate rigid member 40 such as a metallic pipe member is installed to bridge or connect the lower end portions of the side sections 30, 30. Each end of the elongate rigid member 40 is fixedly secured to the side section lower end portion. The thus arranged upper and side sections 20, 30 and the elongate rigid member 40 constitute the generally rectangular back-rest frame 10.

Next, a manner of production of the back-rest frame 10 of the present invention will be discussed along with advantages gained by the back-rest frame.

First, light alloy (aluminium alloy) containing aluminium as a main component is subjected to an extrusion (molding) to form the straight elongate frame material 50 including the hollow base section 51 and the extended wall sections 55a, 55b as shown in FIG. 3. It will be appreciated that use of aluminium renders the resultant back-frame 10 light in weight. Additionally, since aluminium is easily processed or fabricated, the base section 51 of the frame material 50 can have a complicated closed sectional shape such that the side hollows 54, 54 are formed on the opposite sides of the central hollow 53, according to the purposes of usage of the back-frame 10. Furthermore, the hollow base section 51 and the extended wall portions 55a, 55b of the frame material 50 are formed as a one-piece structure.

The complicated closed sectional shape of the frame material 50 improves the rigidity of the resultant back-rest frame 10 while reducing the wall thickness of the back-rest frame, thus achieving weight-lightening of the back-rest frame 10. Additionally, it will be understood that the two side sections 30, 30 and the upper section 20 are formed integrally as a one-piece structure by virtue of being formed of the single frame material 50. This reduces the number of component parts of the back-rest frame 10, thereby omitting any welding operation or the like.

Figure 4:
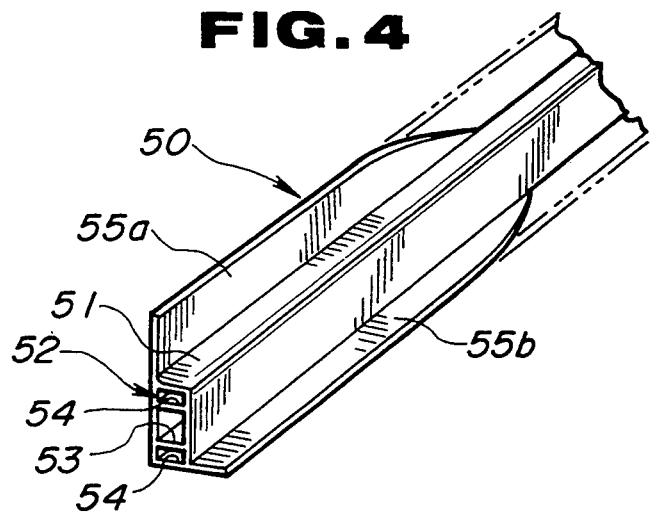
FIG. 4 is a fragmentary perspective view of the frame material of FIG. 3, illustrating a step of producing the frame member of the back-rest frame of FIG. 1.

The straight elongate frame material 50 as shown in FIG. 3 is then bent into the generally U-shape, in which the upper section 20 and the side sections 30, 30 are formed integrally connected with each other. Subsequently, the extended wall sections 55a, 55b of the frame material 50 are cut off from the upper section 20 as illustrated in FIG. 4, so that the extended wall sections 55a, 55b remain only in the the side sections 30, 30 as it is to form the extended wall portion 31 of the back-rest frame 10 as shown in FIGS. 1 and 2. It will be understood that the cutting of the extended wall sections 55a, 55b may be carried out prior to the bending of the frame material 50. Thus, the straight elongate frame material 50 is formed into the back-frame 10 including the upper section 20 and the two side sections 30, 30, in which the extended wall sections 55a, 55b of the frame material 50 serve as the extended wall portions of the base portion 30A (including the side wall part 32 and the rear wall part 33) of the back-rest frame 10.

Figure 5:
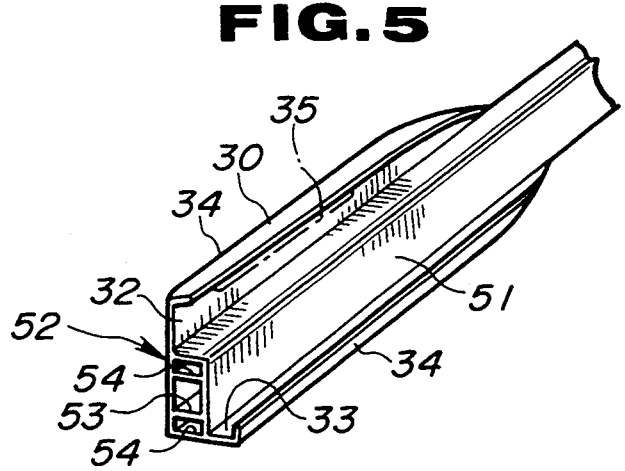
FIG. 5 is a fragmentary perspective view similar to FIG. 4 but illustrating another step of producing the frame member of the back-rest frame of FIG. 1.
Figure 6:
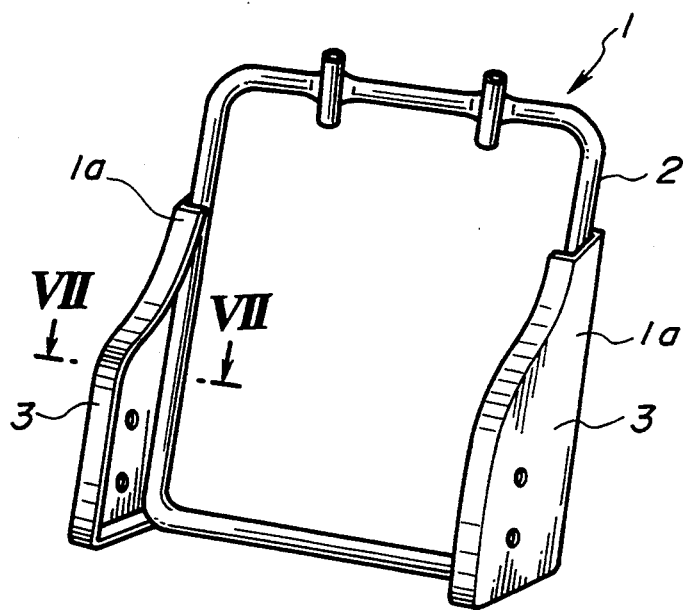
FIG. 6 is a perspective view of a conventional back-rest frame.
Figure 7:
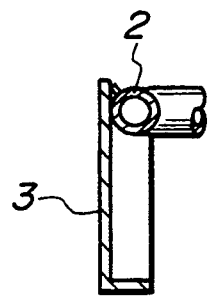
FIG. 7 is a cross-sectional view taken in the direction of arrows substantially along the line VII—VII of FIG. 6.
Figure 8:
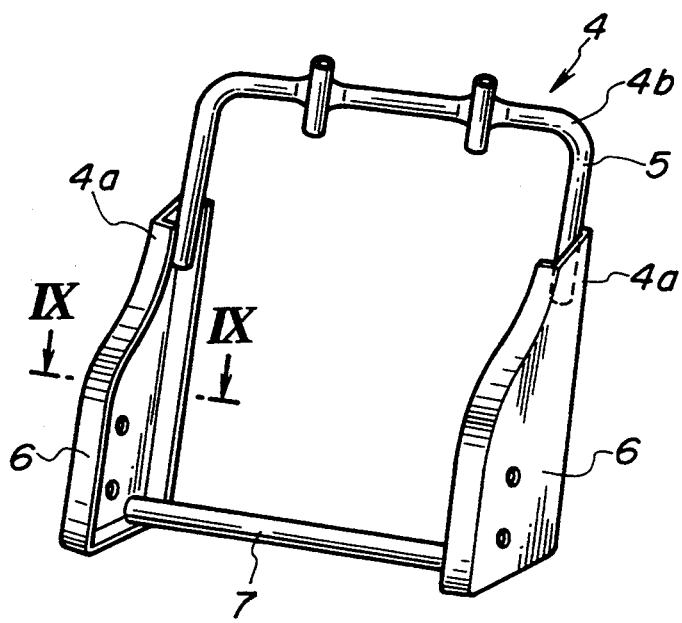
FIG. 8 is a perspective view of another conventional back-rest frame.
Figure 9:
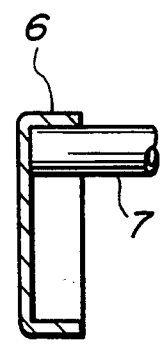
FIG. 9 is a cross-sectional view taken in the direction of arrows substantially along the line IX—IX of FIG. 8.

Then, each of the side wall part 32 and the rear wall part 33 (in the state of FIG. 4) is bent along the length thereof to form the reinforcement flange 34 as shown in FIG. 5. Additionally, the elongate projection or bead 35 is formed in the side section 30 of each side wall part 32. The reinforcement flanges 34 and the beads 35 improve the rigidity of the back-frame 10.

While only one cross-sectional shape of the base portion 30A of the frame member 10a of the back-rest frame 10 has been shown and described as an example, it will be understood that a variety of cross-sectional shapes may be employed for the base portion 30A.

What is claimed is:

1. A method of making a back-rest frame, comprising the steps of:
   providing a single straight elongate member having a constant cross-sectional shape throughout its length, the cross-sectional shape including a base portion and extended wall portions;
   bending the member into a generally U-shape having an upper section and side sections; and
   removing the extended wall portions from the upper section.

2. The method of claim 1, wherein the extended wall portions include a side wall part and a rear wall part, the method further comprising the step of bending said side wall and rear wall parts along their lengths to form reinforcement flanges.

3. The method of claim 2, further comprising the step of forming an elongate projection or bead on the side wall part.

4. The method of claim 2, wherein the side wall part and the rear wall part are perpendicular to each other.

5. The method of claim 2, further comprising the step of providing the side wall part with a seat reclining mechanism.

6. The method of claim 1, wherein the providing step includes the step of extruding said member.

7. The method of claim 6, wherein the extruding step includes the step of extruding the member from an aluminum alloy.

8. The method of claim 1, further comprising the step of connecting lower end portions of the side sections.

9. The method of claim 8, wherein the step of connecting includes the step of connecting lower end portions using a hollow elongate rigid member.

10. The method of claim 1, wherein the providing step includes the step of providing a single straight elongate member having a hollow base portion including side hollows formed on opposite sides of a central hollow.

11. The method of claim 10, wherein the side hollows and the central hollow have rectangular cross-sections.

12. The method of claim 1, further comprising the step of fixedly providing at least one cylindrical holder member on the upper section.

13. A method of making a back-rest frame, comprising the steps of:
   providing a single elongate member having a constant cross-section throughout its length and including a base portion and extended wall portions;
   removing the extended wall portions from a central section of the elongate member; and
   bending the member into a generally U-shape having the central section and side sections.

14. The method of claim 13, wherein the extended wall portions include a side wall part and a rear wall part, the method further comprising the step of bending said side wall and rear wall parts along their lengths to form reinforcement flanges.

15. The method of claim 14, further comprising the step of forming an elongate projection or bead on the side wall part.

16. The method of claim 13, wherein the providing step includes the step of extruding said member.

17. The method of claim 13, further comprising the step of connecting end portions of the side sections, which end portions are distal the central section.

18. The method of claim 13, wherein the providing step includes the step of providing a single elongate member having a hollow base portion including side hollows formed on opposite sides of a central hollow.

19. The method of claim 18, wherein the side hollows and the central hollow have rectangular cross-sections.

20. The method of claim 13, further comprising the step of fixedly providing at least one cylindrical holder member on the central section.

* * * * *